(No Model.)

G. E. WHEELHOUSE.
BICYCLE NAME PLATE.

No. 576,642. Patented Feb. 9, 1897.

WITNESSES
John Buckler,

INVENTOR
George E. Wheelhouse.
BY
Edgar Tate
ATTORNEYS

UNITED STATES PATENT OFFICE.

GEORGE EDWARD WHEELHOUSE, OF UTICA, NEW YORK.

BICYCLE NAME-PLATE.

SPECIFICATION forming part of Letters Patent No. 576,642, dated February 9, 1897.

Application filed June 24, 1896. Serial No. 596,749. (No model.)

*To all whom it may concern:*

Be it known that I, GEORGE EDWARD WHEELHOUSE, a citizen of the United States, and a resident of Utica, in the county of Oneida and State of New York, have invented certain new and useful Improvements in Bicycle Name-Plates, of which the following is a specification, reference being had to the accompanying drawings, forming a part thereof, in which similar numerals of reference indicate corresponding parts wherever found throughout the several views.

The object of this invention is to provide an improved name-plate for bicycles and similar vehicles and means for connecting the same therewith; and the invention is fully disclosed in the following specification, of which the accompanying drawings form a part, in which—

Figure 1:
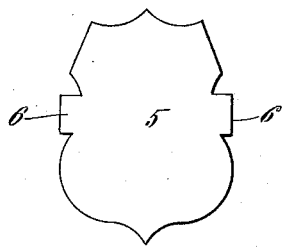
Figure 2:
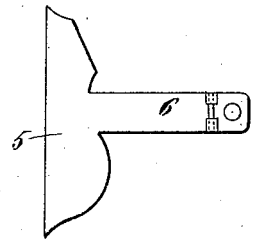
Figure 3:
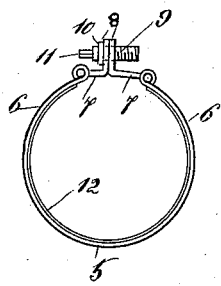
Figure 4:
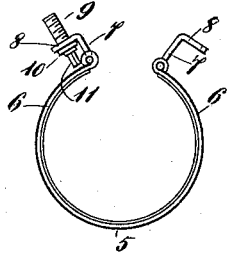

Figure 1 is a front or face view of my improved name-plate; Fig. 2, a side view thereof; Fig. 3, a plan view showing the position of the parts when connected with the frame of a bicycle or other vehicle, and Fig. 4 a plan view showing the position of the parts when not so connected.

In the practice of my invention I provide a name-plate 5, which is preferably in the form of an ordinary shield and which is segmental in cross-section, and the sides thereof are provided with arms 6, which are also segmental in form, and said arms are each provided at their ends with a hinged jaw 7, each of which is provided with outwardly-directed angular extensions 8, and the extensions 8 are provided with transverse passages or openings, which are preferably screw-threaded, and I also provide a screw-threaded bolt 9, having a head 10 and an angular end or extension 11, with which a key or wrench may be connected.

In practice the name-plate is preferably secured in the forward upright rod of the frame of a bicycle or similar vehicle, and in this operation the arms 6 are passed around said rod, and the extensions 8 of the jaws 7 are brought together, as shown in Fig. 3, and the screw-threaded bolt 9 is passed therethrough.

In place of the bolt 9, constructed as herein described, I may provide an ordinary headed bolt, which is screw-threaded and provided with a thumb-nut or bur, and in practice the shield 5 and the arms 6 are provided with a lining 12, of felt or similar material, which is designed to prevent the device from scratching or otherwise injuring the rod of the frame with which it is connected.

This device is simple in construction and operation and perfectly adapted to accomplish the result for which it is intended, and may be connected with any part of the frame of a bicycle or other vehicle, and is also comparatively inexpensive.

Having fully described my invention, I claim as new and desire to secure by Letters Patent—

1. The herein-described name-plate, which is segmental in cross-section, and provided with segmental arms, each arm being provided at its end with hinged jaws, having angular extensions, and a bolt or screw which is adapted to be passed through said extensions, substantially as shown and described.

2. The herein-described name-plate, which is adapted to be connected with the frame of a bicycle or other vehicle, said name-plate being segmental in cross-section, and being provided with segmental arms, each arm being provided at its end with a hinged jaw, each of which is provided with angular or outwardly-directed extensions which are adapted to be brought together, said extensions being provided with passages or openings, and a bolt or screw which is adapted to be passed therethrough, substantially as shown and described.

In testimony that I claim the foregoing as my invention I have signed my name, in presence of the subscribing witnesses, this 17th day of June, 1896.

GEORGE EDWARD WHEELHOUSE.

Witnesses:
MARY A. L. ATWOD,
LEONARD VAN BAASTEN.